US010168960B2

(12) United States Patent
Miller, Jr. et al.

(10) Patent No.: US 10,168,960 B2
(45) Date of Patent: *Jan. 1, 2019

(54) REDUCING PAGE INVALIDATION BROADCASTS IN VIRTUAL STORAGE MANAGEMENT

(71) Applicant: INTERNATIONAL BUSINESS MACHINES CORPORATION, Armonk, NY (US)

(72) Inventors: Robert Miller, Jr., Poughkeepsie, NY (US); Harris M. Morgenstern, Wappingers Falls, NY (US); James H. Mulder, Poughkeepsie, NY (US); Elpida Tzortzatos, Lagrangeville, NY (US); Dieter Wellerdiek, Ammerbuch (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/811,722

(22) Filed: Nov. 14, 2017

(65) Prior Publication Data
US 2018/0088868 A1 Mar. 29, 2018

Related U.S. Application Data

(63) Continuation of application No. 14/925,250, filed on Oct. 28, 2015, now Pat. No. 9,898,226.

(51) Int. Cl.
G06F 12/02 (2006.01)
G06F 3/06 (2006.01)
(Continued)

(52) U.S. Cl.
CPC .......... *G06F 3/0659* (2013.01); *G06F 3/0619* (2013.01); *G06F 3/0685* (2013.01);
(Continued)

(58) Field of Classification Search
None
See application file for complete search history.

(56) References Cited

U.S. PATENT DOCUMENTS 5,956,754 A * 9/1999 Kimmel .............. G06F 12/1036
711/206
6,490,671 B1 12/2002 Frank et al.
(Continued)

OTHER PUBLICATIONS

List of IBM Patents or Patent Applications Treated as Related; (Appendix P), Filed Nov. 14, 2017; 2 pages.

*Primary Examiner* — Kaushikkumar Patel
(74) *Attorney, Agent, or Firm* — Cantor Colburn LLP; William A. Kinnaman, Jr.

(57) ABSTRACT

Technical solutions for reducing page invalidation broadcasts in virtual storage management are described. One general aspect includes a method including allocating, by a storage manager, a virtual memory page to a memory buffer that is used by an application being executed by a multiprocessor system, the virtual memory page being allocated from an address space of the application. The method also includes recording, by a memory management unit, a mapping between the virtual memory page and a physical location in a memory. The method also includes in response to a request, from the application, to deallocate the memory buffer, delaying invalidation of the mapping between the virtual memory page and the physical location in a memory, based on a count of free frames in the address space of the application.

20 Claims, 4 Drawing Sheets

(51) Int. Cl.
*G06F 12/1027* (2016.01)
*G06F 12/1009* (2016.01)

(52) U.S. Cl.
CPC ........ *G06F 12/023* (2013.01); *G06F 12/1009* (2013.01); *G06F 12/1027* (2013.01); *G06F 2212/1016* (2013.01); *G06F 2212/1041* (2013.01); *G06F 2212/152* (2013.01); *G06F 2212/657* (2013.01); *G06F 2212/682* (2013.01); *G06F 2212/683* (2013.01)

(56) References Cited

U.S. PATENT DOCUMENTS

| | | | | |
|---|---|---|---|---|
| 7,454,590 | B2* | 11/2008 | Jordan | G06F 12/1027 711/202 |
| 7,552,255 | B1* | 6/2009 | George | G06F 12/1036 710/58 |
| 8,949,571 | B2 | 2/2015 | Bennett et al. | |
| 9,390,027 | B1 | 7/2016 | Miller et al. | |
| 9,740,605 | B2 | 8/2017 | Miller et al. | |
| 2005/0114607 | A1* | 5/2005 | Cohen | G06F 12/1027 711/135 |
| 2009/0083496 | A1* | 3/2009 | Stevens, Jr. | G06F 12/0808 711/144 |
| 2013/0031333 | A1* | 1/2013 | Sankaran | G06F 12/1027 711/207 |
| 2014/0095784 | A1* | 4/2014 | Tran | G06F 12/1027 711/108 |
| 2015/0120985 | A1* | 4/2015 | Frey | G06F 12/10 711/6 |
| 2017/0091097 | A1* | 3/2017 | Waugh | G06F 12/0815 |
| 2017/0123725 | A1 | 5/2017 | Miller et al. | |
| 2017/0123735 | A1 | 5/2017 | Hom et al. | |
| 2018/0032435 | A1 | 2/2018 | Parker et al. | |

\* cited by examiner

REDUCING PAGE INVALIDATION BROADCASTS IN VIRTUAL STORAGE MANAGEMENT

DOMESTIC PRIORITY

This application is a continuation of and claims priority from U.S. patent application Ser. No. 14/925,250, filed on Oct. 28, 2015, entitled "REDUCING PAGE INVALIDATION BROADCASTS IN VIRTUAL STORAGE MANAGEMENT", the entire contents of which are incorporated herein by reference.

BACKGROUND

The present application relates to computer technology, and particularly to virtual memory management, such as by an operating system.

Applications, such as computer programs, executing on a computer, have many different modes of handling virtual storage. An application obtains and releases virtual storage via system calls, and relies on the computer to manage the virtual storage. Typically, an operating system of the computer manages allocation and freeing of the virtual storage. For example, the operating system manages an association of a virtual memory pages and corresponding real frames, the real frame being a memory space in storage of the computer. The operating system may also manage swapping the real frames in and out of the storage. When the virtual memory page is freed, if the pages are associated with real frames, the virtual to real association must be removed not only from the page table, but also from the Translation Lookaside Buffers (TLBs) associated with each active processor in the computer. The processor performing the invalidation must issue an instruction to broadcast the virtual address being invalidated to all other processors in the system. Such a broadcast is very disruptive to ongoing work and becomes even more disruptive as the number of processors increase.

SUMMARY

One general aspect includes a system that includes a memory. The system also includes a plurality of processors, and a storage manager. The storage manager receives a request to deallocate a memory buffer that is being used by an application. The storage manager identifies a virtual memory page corresponding to the memory buffer. The storage manager delays invalidation of the virtual memory page. The invalidation includes a broadcast to each of the processors to remove an association between the virtual memory page and a corresponding physical memory location.

Another general aspect includes a computer product including a non-transitory computer readable storage medium that includes computer executable instructions. The non-transitory computer readable storage medium includes instructions to receive, from an application, a request to deallocate a memory buffer being used by the application. The non-transitory computer readable storage medium includes instructions to identify a virtual memory page corresponding to the memory buffer. The non-transitory computer readable storage medium includes instructions to delay invalidation of the virtual memory page in response to the request to deallocate the memory buffer, where the invalidation includes broadcast of a request to a plurality of processors to remove an association between the virtual memory page and a corresponding physical memory location.

Another general aspect includes a method including allocating, by a storage manager, a virtual memory page to a memory buffer that is used by an application being executed by a multiprocessor system, the virtual memory page being allocated from an address space of the application. The method includes recording, by a memory management unit, a mapping between the virtual memory page and a physical location in a memory. The method includes in response to a request, from the application, to deallocate the memory buffer, delaying invalidation of the mapping between the virtual memory page and the physical location in a memory, based on system conditions as directed by a system resource manager.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

An operating system manages virtual memory of a computer, such as a multiprocessor system. The multiprocessor system executes multiple applications simultaneously. The operating system allocates each application a corresponding address space in the virtual memory. The operating system manages the address space for the application. For example, the application requests the operating system to allocate a memory buffer any time the application is in need of memory space for its operation. In response to the request, the operating system may manage a mapping between the virtual memory and physical memory.

Figure 1:
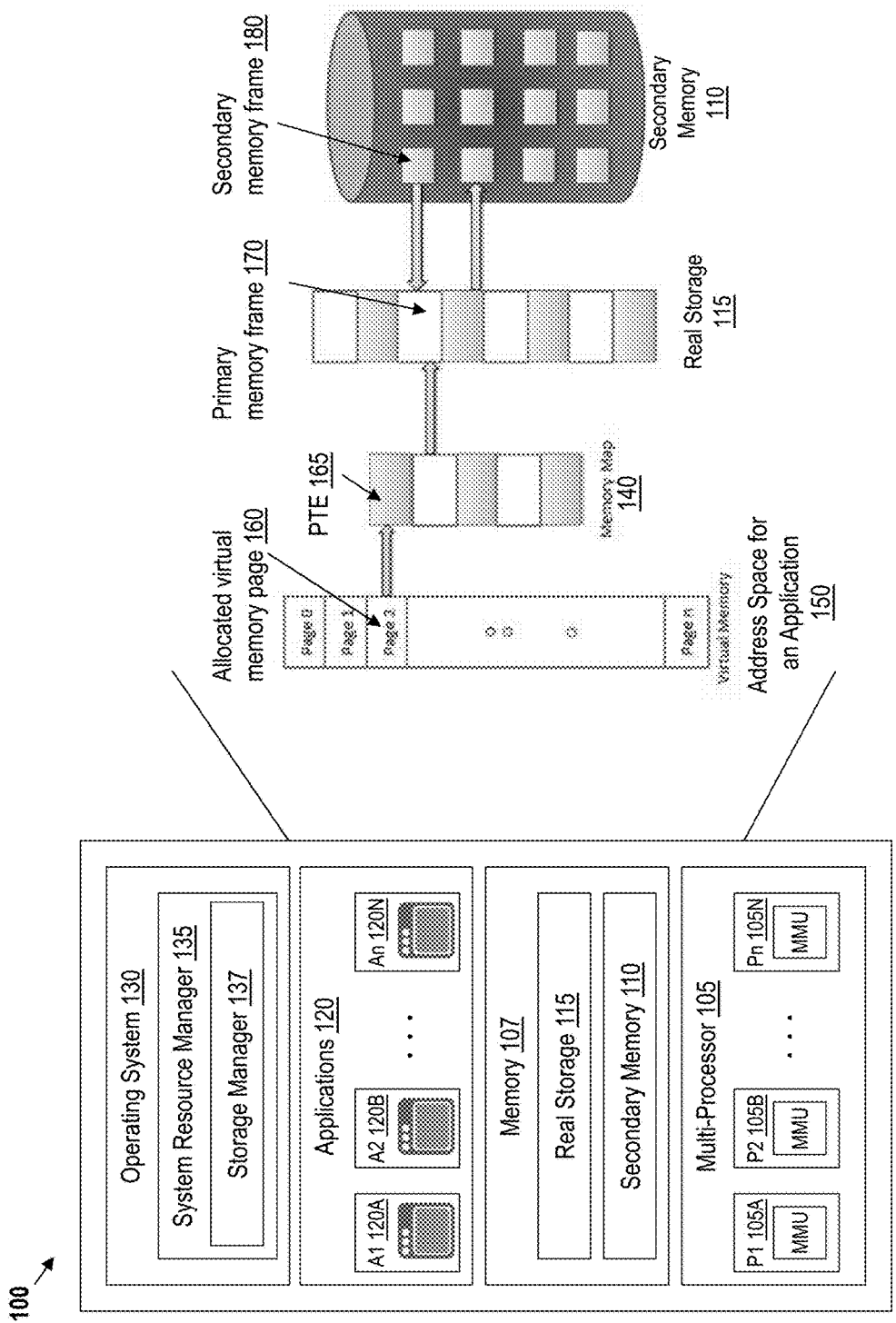
FIG. 1 illustrates a virtual memory management in an example system.

FIG. 1 illustrates virtual memory management in an example system. A system 100 is shown that includes a multiprocessor 105, and a memory 107. The memory 107 includes a secondary memory 110 and a real storage 115. The system 100 may execute one or more applications 120, and an operating system 130 may manage operations of the system 100. The system 100 may include other components such as a communication interface, an input device (such as a keyboard, a mouse, a touchscreen), an output device (such as a display, a printer), and other electronic circuitry not shown in FIG. 1.

The multiprocessor 105 is a central processor of the system 100, and is responsible for execution of the operating system 130, the applications 120, and any other executable instructions. The multiprocessor 105 is operable to execute logic. The logic includes computer executable instructions or computer code embodied in the memory 107 or in other memory that when executed by the multiprocessor 105, cause the multiprocessor 105 to perform the features implemented by the logic. The computer code includes instructions executable with the multiprocessor 105. The computer code may include embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code. The multiprocessor 105 may be a general processor, central processing unit, server, application specific integrated circuit (ASIC), digital signal processor, field programmable gate array (FPGA), digital circuit, analog circuit, or combinations thereof. The multiprocessor 105 is in communication with the memory 107, the operating system 130, and the applications 120, and other components of the system 100.

The multiprocessor 105 includes a plurality of processors P1-Pn 105A-105N. Each processor may operate independently. Alternatively or in addition, the processors 105-105N may operate in conjunction. Each processor, among other circuitry, includes a memory management unit (MMU). The MMU is a computer hardware unit that translates a virtual memory address to physical memory address. The MMU, in addition, may be responsible for memory protection, cache control, and bus arbitration.

The memory 107 includes non-transitory computer storage medium. The memory 107 stores control instructions and data of the operating system 130 and the applications 120 that are executable by the multiprocessor 105. In addition, the memory 107 may contain other data such as images, videos, documents, spreadsheets, audio files, and other data that may be associated with operation of the system 100.

The memory 107 includes the real storage 115, which is volatile memory such as dynamic random-access memory (DRAM), static random-access memory (SRAM), or any other type of volatile memory or a combination thereof. The memory 107 also includes the secondary memory 110, which is non-volatile memory such as hard disks, magnetic tape, flash memory, or any other type of non-volatile memory or combination thereof.

The applications 120 include software applications A1-An 120A to 120N. The multiprocessor 105 may be executing the applications 120. The operating system 130 is responsible for managing the operations of the system 100. The operating system 130 may be any operating system such as z/OS™, WINDOWS™, LINUX™, OS/X™, or any other operating system. The operating system 130 includes a system resource manager 135 and a storage manager. The system resource manager 135 manages the resources among the applications 120 that are being executed on the system 100. In this regard, the system resource manager 135 monitors the resources currently allocated and used by the applications 120. The system resource manager 135 may request an application to release resources that were allocated for that application, and allocate the freed resources to another application. The system resource manager 135, thus, balances the resources among the applications 120. To this end, the system resource manager 135 may include the storage manager that maintains statistics about the allocation and usage of the resources by the applications 120. Among other resources, the storage manager under the direction of the System Resource Manager 135 may manage and balance the allocation and use of memory 107, particularly real storage 115, by the applications 120. The storage manager is responsible for providing interfaces to the application for obtaining and freeing virtual storage, for backing virtual storage with real storage and for paging or swapping virtual storage backed in real to auxiliary (secondary) storage. The system resource manager uses storage usage statistics provided by the storage manager to instruct the storage manager to balance the allocation and use of real storage by the application.

The applications 120 may, together, use or require more real storage 115, than what is physically available in the system 100. Hence, the system 100 may use virtual memory management for executing the applications 120. Using virtual memory management, the operating system 130 maps memory addresses used by an application, called virtual addresses, into physical addresses in the real storage 115.

For example, as shown in FIG. 1, the operating system 130 allocates a virtual memory 150 for each of the applications 120. A page is a block of contiguous virtual memory addresses of a predetermined size and a frame is a block of contiguous physical memory addresses of a predetermined size. The MMUs of the multiprocessor 105 map a virtual address in the virtual memory 150 to a physical address in the real storage 115. The MMUs maintain a memory map 140 that associates the virtual address with the physical address or memory location.

For example, the memory map 140 may include an in-memory table of items called a page table per application 120A. The page table contains a page table entry (PTE) per page in the virtual memory 150, to map a virtual page to a physical page. The MMUs uses an associative cache, called a translation lookaside buffer (TLB), to avoid the necessity of accessing Dynamic Address Translation Tables (DAT tables) every time the application references virtual memory. Each MMU may have its own TLB. In an example, the operating system 130 may load into the real storage 115, the pages that are being used by an application, such as the application 120A. The operating system 130 may swap pages in the real storage 115 into the secondary memory 110. The secondary memory 110 may be a separate non-volatile storage designated as the secondary memory 110, or a section of a non-volatile storage delineated as a swap file, or a swapping partition.

In an example, the application 120A allocates and deallocates a memory buffer. The application 120A requests the operating system 130 to allocate and deallocate the memory buffer. In response to a request to allocate the memory buffer, the operating system 130 allocates one or more pages of the virtual memory 150 to the memory buffer. For example, the operating system 130 allocates a virtual memory page 160 in the virtual memory 150. The operating system maps the virtual memory page 160 with a corresponding memory frame 170 in the real storage 115. The operating system 130 records the mapping in the memory map 140. For example, the operating system 130 may create or update a PTE 165 in the memory map 140. The mapping may be stored in the TLB of a subset of the processors of the multiprocessor 105. The operating system 130 may swap the primary memory frame 170 into an auxiliary (or secondary) memory frame 180 in the secondary memory 110.

Subsequently, the application 120A may request the operating system 130 to deallocate the memory buffer. Consequently, the operating system 130 may deallocate the virtual memory page 160. When the virtual memory page 160 is freed, if the page is associated with the primary memory frame 170, the virtual to real association in the PTE is typically removed not only from the page table, but also from the TLBs associated with each processor. For example, the operating system 130 may issue an Invalidate Page Table Entry instruction, such as the IPTE instruction of z/Architecture™, which broadcasts an invalidation signal for the virtual address being invalidated to all the processors in the system 100. The IPTE instruction not only invalidates a virtual to real mapping in the page table entry, but also signals every processor to update their TLBs should they contain a mapping of the page being invalidated. This broadcast can be disruptive to ongoing work and becomes even more disruptive as the number of processors increase.

The system 100 may reduce the disruptive broadcasts associated with page invalidations using an instruction, such as the IPTERANGE instruction in Z/ARCHITECTURE™, to invalidate a range of primary memory pages with a single invalidation broadcast to the processors. Similarly, the IDTE instruction invalidates all storage associated with a higher level DAT structure (such as a single segment in z/Architecture) with a single broadcast. However, despite usage of such instructions the number of invalidation broadcasts still depends on the behavior of the application 120A. For example, if the application 120A obtains and frees a single virtual memory page, such as the virtual memory page 160, at a time, the number of IPTE invocations does not change. Additionally, even if the application 120A frees more than a single virtual memory page at a time, if it subsequently obtains pages at the same virtual storage addresses, the system 100 incurs the overhead of reobtaining real storage to back the pages as well as repopulating the cache and TLB.

Disclosed herein are systems and methods for reducing the number of page invalidations, increase cache consistency, and reduce memory management path length. For example, based on predetermined conditions, the virtual to real association in the PTE is not broken when the application 120A requests releasing the memory buffer. The operating system 130 delays releasing the corresponding primary memory frame 170 and marks the primary memory frame 170 as a "Freed Frame." The operating system 130 thus, avoids the overhead of the invalidation broadcast when invalidating the page, and further avoids the overhead of the bookkeeping of processing the corresponding primary memory frame 170 that is no longer in use. If the virtual memory page 160 that was just freed by the application happens to be re-obtained within a small interval of time, addressability to the page in the TLB may still exist and the data for the page may already be in the cache for the processor obtaining the storage. Thus, the storage manager may avoid the overhead of having to obtain a new frame to back the virtual storage and the application may avoid the subsequent TLB and cache misses when accessing it.

The system resource manager 135 may track statistics of frame reuse to determine whether the application 120A is effectively reusing freed frames. When the application 120A is not efficiently using the number of freed frames, a predetermined freed frames threshold is reduced. When nearly all freed frames are reused by the application 120A the freed frames threshold is increased. For example, the system resource manager 135 may keep track of a number of freed frames owned by all applications 120 and limit the maximum number of freed frames that an application 120A can own. For example, if the number of freed frames crosses a predetermined freed frames threshold, performance of other storage management functions owned by the applications may degrade. The system resource manager 135 may setup the predetermined freed frames threshold for the application 120A.

Figure 2:
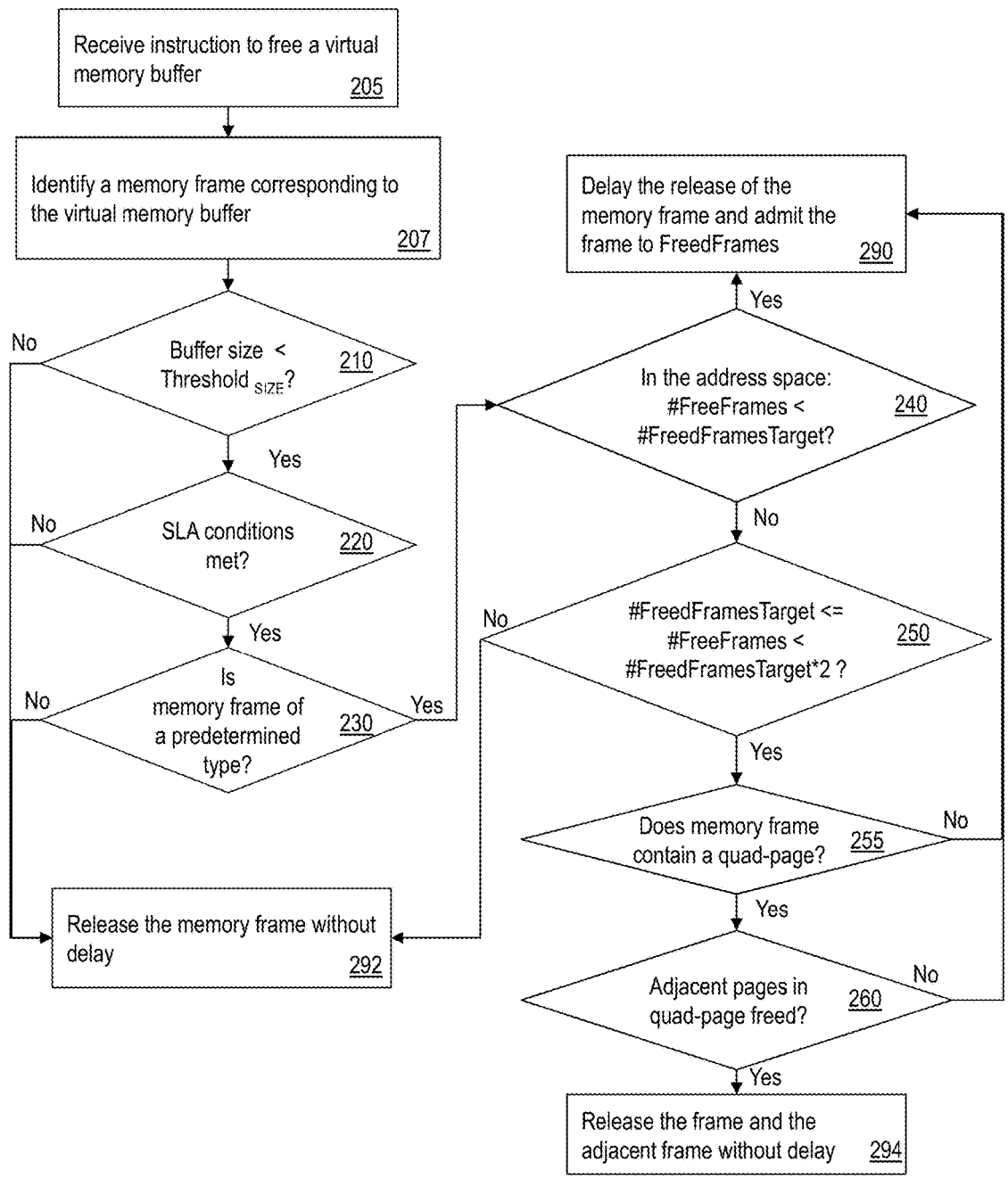
FIG. 2 illustrates a flow diagram illustrating example logic of freeing a virtual memory buffer in accordance with an embodiment.

FIG. 2 illustrates example logic implemented by the operating system 130 for freeing a virtual memory buffer. The operating system 130 may implement the operations in a different order in another example. In an example, the operating system 130 provides a storage free routine, which obtains control via a system call to release virtual storage and real storage that is associated with the virtual storage. In one embodiment, the operating system 130 receives a request from the application 120A to release a virtual memory buffer, as shown at block 205. In response to receiving the request to release the virtual memory buffer, the operating system 130 identifies a primary memory frame, as shown at block 207. The operating system 130 determines whether the size of the virtual memory buffer is less than a predefined threshold, as shown at decision block 210. In one embodiment, in z/OS the threshold is 256 pages. Of course, the threshold may be different in other embodiments and the threshold may be configurable. If the size of the virtual memory buffer exceeds the threshold, the operating system 130 may release the virtual memory buffer and the corresponding primary memory frame without any delay, as shown at block 292, since doing so may result in fewer page invalidation broadcasts than freeing smaller buffers. In case the virtual memory buffer is less than the threshold, the operating system 130 may delay releasing the primary memory frame, as shown at block 290, based on other parameters. For example, the operating system 130 may determine if any Service Level Agreement (SLA) terms are being met, as shown at block 220. For example, the operating system 130 may have an SLA that indicates a predetermined amount of freed frames. If the SLA terms are not being met, the operating system 130 releases the virtual memory buffer, as shown at block 292. Alternatively, the operating system 130 may delay releasing the primary memory frame, as shown at block 290, based on other parameters. The storage manager 137 of the operating system 130 may admit the memory frame as a "Freed Frame," which marks the corresponding virtual memory as being unallocated but maintains the association between the virtual storage and the backing real frame (that is, the pages are not invalidated).

Figure 4:
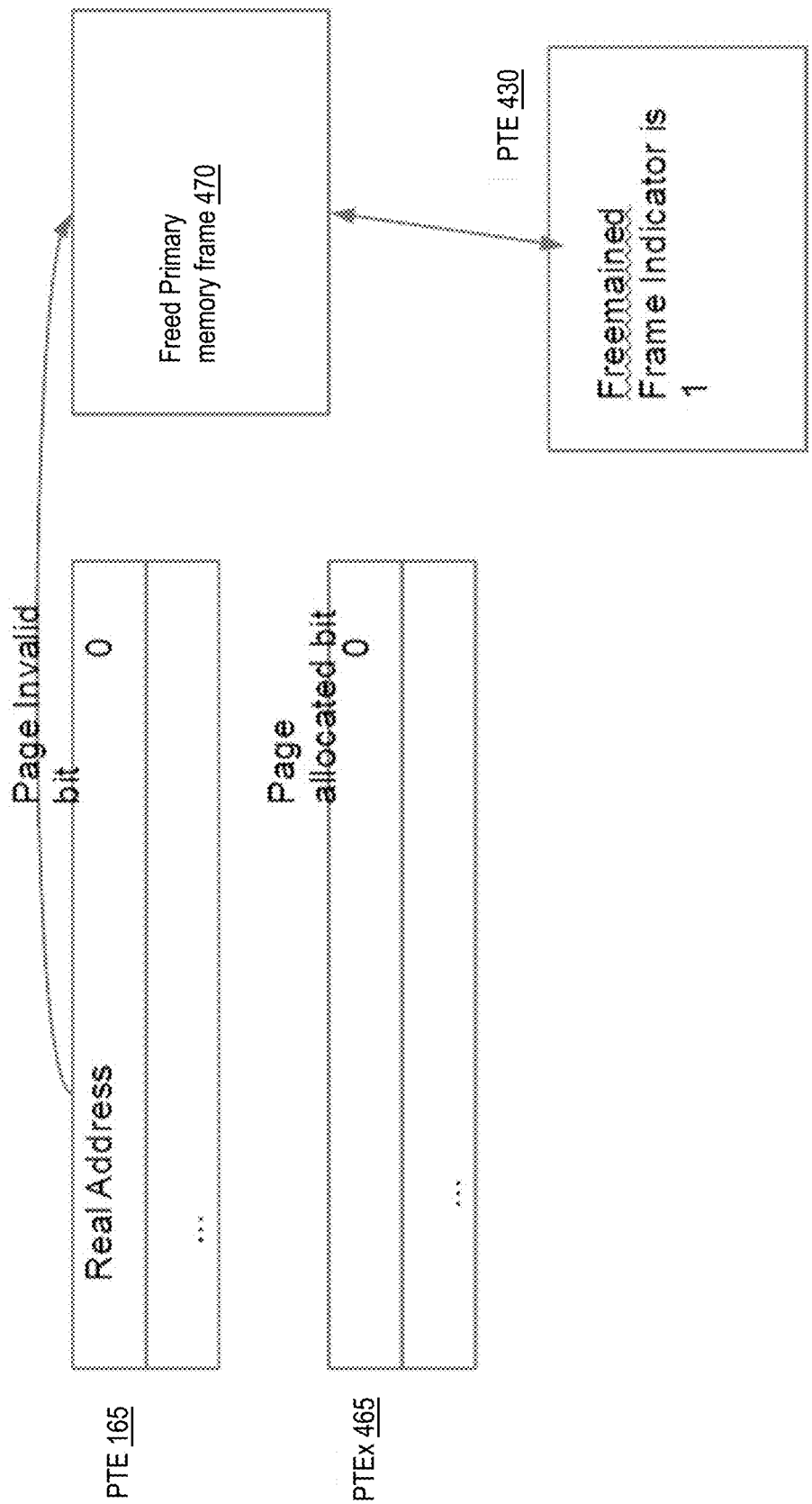
FIG. 4 illustrates an example state of a page table entry (PTE) that maps a page backed by a freed frame when it has been delayed from being released in accordance with an embodiment.

FIG. 4 illustrates an example state of a PTE of a freed frame when it has been delayed from being released. The PTE 165 may identify the memory location of the primary memory frame 470 that has been freed (but not released). The PTE 165 may further indicate that the page is valid in real, for example, based on a page invalid identifier in the PTE 165. The operating system 130 in addition maintains a Page Table Entry Extension (PTEx) 465, which maintains attributes of the page (such as, its location when not on real storage), but is not part of the hardware architecture. The PTEx 465 includes an identifier that indicates that the page is 'freed' and can be reallocated. For example, the PTEx 465 may include a page allocated bit that indicates whether the page is currently allocated to a memory buffer. In an example, the page allocated bit being 0 (zero) indicates that the page is not currently allocated, and being 1 (one) indicates that the page is currently in use. Other examples may use other bit values or a different identifier than a bit. The operating system may maintain the state of the identifier. Further, the operating system may maintain a page frame table entry (PFTE) 430 to contain attributes associated with the primary memory frame 170. The PFTE 430 may identify that the corresponding primary memory frame is a freed frame. For example, the PFTE 430 may include a freed frame indicator that identifies whether the corresponding primary memory frame 170 is a freed frame, a released frame, or a frame in use, or any other state of the primary memory frame 170.

In another example, the operating system 130 determines if the primary memory frame corresponding to the virtual memory buffer to be freed is of a predetermined type that can be freed after a delay, as shown at decision block 230. For example, the operating system 130 cannot delay releasing frames within a predetermined memory address range. For example, in Z/ARCHITECTURE, a frame with physical address less than 16Meg represents a scarce system resource. Other operating systems may use different address ranges, or different indicators to identify scarce system resources. Additionally the operating system 130 may ensure that the frame is not part of a quad-group or a 1M frame group because these frame groups are costly to reform if their 4k units are left owned by different address spaces. Thus, if the primary memory frame corresponding to the virtual memory buffer is of the predetermined type, such as a scarce resource, or part of a quad-group, the operating system 130 releases the virtual memory buffer and the primary memory frame without any delay, as shown at block 292. Else, the operating system 130 may add the primary memory frame to the freed frames and delay releasing the frame based on other parameters, as shown at block 290.

For example, the operating system 130, via a storage release processor, may compare a number of freed frames in the address space of the application 120A to determine if the number is less than a "FreedFramesTarget" that is maintained by the system resource manager, as shown at decision block 240. If the number of freed frames is less than the predetermined target, the operating system 130 maintains the virtual to real association. Else, the operating system 130 may compare the number of free frames with a second threshold, such as FreedFramesTarget*2, as shown at decision block 250. Other second thresholds may be used in other examples. In an example, the operating system 130 may check if #FreedFramesTarget<=#FreeFrames<#FreedFramesTarget*2. If the above condition is not met, the operating system 130 will invalidate the virtual page and release the associated frame without delay, as shown at block 292.

Else, if the above condition is met, for example, when the number of freed frames in the address space exceeds the FreedFramesTarget but is less than twice the FreedFramesTarget, the storage manager 137 may identify whether the memory frame contains a quad-page, as shown at block 255. If the frame does not contain a quad-page, the operating system 130 delays the release of the memory frame, as shown at blocks 255 and 290. Else, if the frame is part of a quad-page, the storage manager 137 identifies a status of neighboring pages corresponding to the virtual memory buffer to be freed, as shown at decision block 260. The operating system 130 may determine if the neighboring three pages in the quad-page are backed by real frames that are also part of the freed frame set, in which case the entire group of quad-page is released without delay, as shown at block 294, such as using the IPTERANGE instruction. For this, the operating system 130 may round the virtual address of the page to be freed to a quad-page boundary. For example, in Z/ARCHITECTURE where pages are 4096 bytes ($2^{12}$), the start of a quad-page boundary is computed as Page Address & 'FFFFC000'x (in case the Page Address is a 31 bit address). Other examples may round the virtual address according to different setups. Alternatively, if the adjacent pages in the quad-page are not freed, the operating system 130 may delay releasing the virtual to real association of the memory frame, as shown at blocks 260 and 290.

By implementing the above logic, the operating system 130 reduces the number of page invalidation broadcasts by delaying when the frame is actually released. In addition, the operating system 130 uses the IPTERANGE instruction which can invalidate a set of sequential pages with only a single broadcast as described elsewhere in the present document. The operating system's 130 storage manager 137 maintains statistics regarding the freed frames to determine what action would be most efficient. For example, the storage manager 137 when processing a storage release request ensures that when the total number of Freed Frames exceeds twice the "FreedFramesTarget" threshold, frames are immediately returned to the system.

Accordingly, the System Resource Management function of the operating system 137 ensures that there are sufficient available frames in the system 100. The System Resource Manager may indicate to the operating system 130 via a control block whether to admit the frames as freed frames, either at the system level or at the address space level. In an example, the System Resource Manager sets the "FreedFramesTarget" of the address space of the application 120A to zero (0), thus controlling when the Storage manager admits frames in response to a free storage request from the application 120A. In an example, the System Resource Manager may set the FreedFramesTarget for every address space.

In addition, the storage manager 137 may maintain address space and system level statistics describing the state of Freed Frames. For example, when a new freed frame is admitted to the set of freed frames, the "FreedFramesCount" associated with the address space and "FreedFramesSystemCount" are incremented. As described throughout the present document, the set of freed frames is the set of frames whose release is delayed. Thus, #FreedFramesCount represents a number of frames whose release is delayed. Additionally, if the virtual storage address that the frame backs is greater than any other virtual storage address backed by a freed frame, the new "FreedFramesHighVsa" is recorded. This address is used in steal processing since it provides a starting location where freed frames can be found. Additionally, a monotonically increasing count of "FreedFramesMonotonic" is incremented.

Table 1 identifies counts associated with freed frames of an address space and how and when the storage manager 137 updates statistics related to the freed frames.

TABLE 1

| Address Space Counter | When Updated | How Updated |
| --- | --- | --- |
| FreedFramesCount | Storage Deallocation | Incremented |
| FreedFramesCount | Storage Allocation | Decremented |
| FreedFramesCount | Frame Steal | Decremented |
| FreedFramesMonotonic | Storage Deallocation | Incremented |
| FreedFramesReusedMonotonic | Storage Allocation | Incremented |
| FreedFramesFailedMonotonic | Storage Allocation | Incremented |

TABLE 1-continued

| Address Space Counter | When Updated | How Updated |
|---|---|---|
| FreedFramesHighVsa | Storage Deallocation | Set to MAX(FreedFramesHighVsa, Vsa of buffer) |
| FreedFramesHighVsa | Frame Steal | Decremented by some multiple of the page size during Freed Frames steal processing |

Table 2 identifies counts associated with freed frames of at the system level and how and when the storage manager 137 updates statistics related to the freed frames.

TABLE 2

| System Level Counter | When Updated | How Updated |
|---|---|---|
| FreedFramesSystemCount | Storage Deallocation | Incremented |
| FreedFramesSystemCount | Storage Allocation | Decremented |
| FreedFramesSystemCount | Frame Steal | Decremented |

Figure 3:
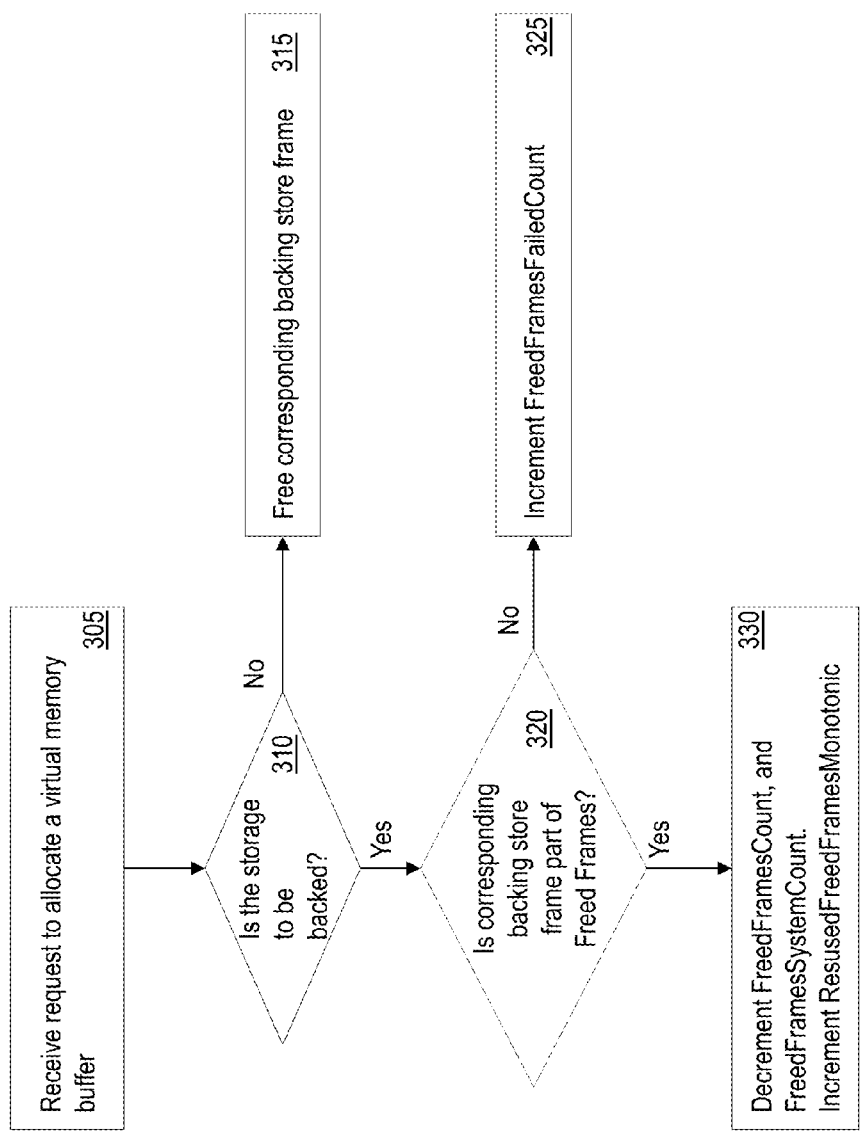
FIG. 3 illustrates a flow diagram illustrating example logic of allocating a virtual memory buffer in accordance with an embodiment.

FIG. 3 illustrates an example logic that the operating system 130 implements in response to the storage allocation request. The operating system 130 performs a storage allocation in response to a request from the application 120A to obtain a virtual memory buffer, as shown at block 305. The operating system 130 detects whether there are freed frames to associate with the virtual memory buffer. In an example, the operating system 130 may first determine whether the application 120A requested that the memory that is not to be backed, as shown at decision block 310. In this case, the operating system 130 releases the primary memory frames corresponding to the memory buffer, as shown at block 315. The operating system may do so in an efficient manner, such as using an instruction (such as the IPTERANGE provided in z/Architecture) to invalidate contiguous pages with a single broadcast. Alternatively, the application 120A wants the pages to be backed at the time of obtaining the memory, as shown at decision block 310. In this case, if the operating system 130 uses a primary memory frame from the freed frames as the backing frame, as shown at decision block 320, the operating system 130 clears the frame, marks the area of the primary memory as allocated, and updates the statistics related to the freed frames in the address space and system 100, as shown at block 330. For example, the storage manager 137 decrements the "FreedFramesCount" associated with the address space and the "FreedFramesSystemCount" as shown at block 330. The storage manager 137 additionally increments a monotonically increasing counter of the number of "FreedFramesReusedMonotonic" associated with the address space by 1 (one), as shown at block 330. Thus, the overhead of obtaining a new primary memory frame is avoided. Further, if the storage being obtained was freed a small time interval earlier, the real address of the memory frame may still resides in the processor's cache. In an example, the operating system 130 may associate the virtual memory buffer with the primary memory frame that was previously used. Thus, the cache miss that occurs when the frame is cleared by the system resource manager 135 is avoided, resulting in a performance improvement. Additionally, since the virtual-to-real bind in the PTE remained intact, the TLB entry associated with the virtual storage address may also remain in effect, resulting in a fast virtual address translation when the application references the storage.

The System Resource Manager 135 monitors the counters, "FreedFramesReusedMonotonic" and "FreedFramesMonotonic," to determine how well the application 120A is reusing freed frames. Conversely, when the page being allocated is not backed by a freed frame, (320) but there exists freed frames owned by the address space, a "FreedFramesFailedMonotonic" is incremented as shown at block 325); this is another monotonically increasing counter used to determine whether the address space is making effective use of its freed frames.

Thus, the system resource manager 135 relies on the counts maintained by the storage manager 137 to determine whether to retain the virtual to real bind in response to a request to free the memory buffer from the application 120A. The storage manager 137 is responsible for managing the "Freed Frames" at both the address space and system level. When the system 100 runs low on frames, the storage manager 137 is responsible for preventing additional frames from being admitted as "Freed Frames." The system resource manager 135 may set the "FreedFramesTarget" on the address space corresponding to the application 120A. The FreedFramesTarget restricts the admission of new "Freed Frames." In addition, the system resource manager 135 may direct the Storage Manager 137 to release the Freed Frames that the address spaces own, when the system runs low on storage, prior to stealing in use memory. The storage manager 137 uses the "FreedFramesSystemCount" and the "FreedFramesCount" in this effort.

Based on monitoring the statistics of the address space, the storage manager 137 may determine that the address space is not making efficient use of "Freed Frames." In such a case, the storage manager 137 reduces the "FreedFramesTarget" corresponding to the address space, free some or all of the "Freed Frames" in the address space, or a combination of both. Determining whether the address space is making efficient usage of "Freed Frames" is based on the calculation of "FreedFramesReusedMonotonic" and "FreedFramesMonotonic." For example, if value of a ratio of "FreedFramesReusedMonotonic" to "FreedFramesMonotonic" is less than or equal to 1, but when the value is close to 1 the storage manager 137 concludes that most frames that were previously admitted to the set of "Freed Frames" were reused when the storage was subsequently re-allocated.

Additionally, the storage manager 137 samples the "FreedFramesFailedMonotonic" monotonically increasing count to determine whether freed frames are being reused by the address space. If this number is continually growing and the number of freed frames in the address space exceeds "FreedFramesTarget" for the address space, the storage manager 137 concludes that the virtual address selected to back storage allocations within the address space is not falling in an area backed by freed frames. In this case, the storage manager 137 may decide to steal some or all of the freed frames owned by the address space. The stealing of freed frames is tied to the way in which virtual storage is allocated in the address space. That is, if storage is allocated from lower to higher (i.e. ascending) addresses, then steal processing traverse Dynamic Address Translation (DAT) structures, such as the PTE, in descending order starting from higher addresses to lower addresses in search of freed frames. Thus, virtual addresses that are less likely to be allocated using storage allocation requests lose their associated freed frames. Further, during the steal, when a contiguous sequence of pages that are either backed by freed frames or are invalid are encountered, the storage manager 137 uses the IPTERANGE or IDTE instructions, for example in a Z/ARCH system, to minimize the number of invalidation broadcasts.

The technical solutions described throughout the present document provide techniques to reduce page invalidation broadcasts to multiple processors in a system. The instruction to invalidate a page is relatively expensive since it signals each processor in the system to indicate that its translation entry in the TLB is to be removed. The technical solutions in the present application delay releasing a virtual-to-real memory bind, or mapping in the PTE in response to a request to deallocate a memory buffer from an application. The storage manager updates the PTEx corresponding to the page and the PFTE corresponding to the associated frame. The PTE does not change, and instead the PTEx is updated to indicate that the page is not allocated. Thus, the page itself is no longer logically allocated. Subsequently, if the application requests a reallocation, the page may be allocated by updating the PTEx. Since the virtual-to-real mapping was maintained, the processors may avoid cache misses, as the TLB may continue to associate the page with the corresponding frame. Alternatively or in addition, in case the system or the application is running low on available frames, which the system resource manager detects based on counts of available frames, the system resource manager may initiate release of the bindings of the one or more pages that are not logically allocated. The operating system may release the pages by first invalidating them by using instructions such as IPTERANGE that invalidate multiple pages at once. Thus, the above techniques reduce the number of page invalidation requests that are broadcast in the system. Accordingly, the technical solutions improve efficiency of the system, particularly the virtual memory management of the operating system in a multiprocessor system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory;
   a plurality of processors; and
   a storage manager configured to, in response to receiving a request to deallocate a memory buffer, initiating an invalidation of a virtual memory page corresponding to the memory buffer, the invalidation comprising a broadcast to each of the processors to remove an association between the virtual memory page and a corresponding physical memory location, wherein the storage manager is configured to delay the invalidation in response to a size of the memory buffer being smaller than a predetermined buffer threshold.

2. The system of claim 1, wherein the storage manager is configured to delay the invalidation in response to the virtual memory page being a predetermined type.

3. The system of claim 1 wherein the storage manager is configured to delay the invalidation in response to a free amount of the memory available to the system being below a predetermined threshold.

4. The system of claim 1, wherein the storage manager is configured to delay the invalidation in response to a number of free frames in an address space for an application that allocated the memory buffer being lesser than a predetermined target number of free frames for the address space.

5. The system of claim 1, wherein the storage manager is configured to delay the invalidation in response to:
   a number of free frames in an address space for an application that allocated the memory buffer not being lesser than a predetermined target number of free frames for the address space; and
   another virtual memory page adjacent to the virtual memory page being a valid frame that has not been freed.

6. The system of claim 5, wherein the storage manager is configured to invalidate the virtual memory page without a delay, in response to another virtual memory page adjacent to the virtual memory page being backed by a freed frame.

7. The system of claim 5, wherein the storage manager is configured to delay the invalidation further in response to the number of free frames in the address space for the application being less than a second predetermined threshold for the address space of the application.

8. The system of claim 7, wherein the storage manager is configured to invalidate the virtual memory page without a delay, in response to the number of free frames in the address space for the application not being less than the second predetermined threshold for the address space of the application.

9. The system of claim 1, wherein the storage manager is further configured to increment, in response to delaying the invalidation, a count of a number of free frames in an address space of an application that allocated the memory buffer, a count of a total number of free frames, and a monotonic counter of a number of free frames freed.

10. A computer program product comprising a non-transitory computer readable storage medium that comprises computer executable instructions, the non-transitory computer readable storage medium comprising instructions to:
   in response to receiving a request to deallocate a memory buffer:
   initiating an invalidation of a virtual memory page corresponding to the memory buffer, the invalidation comprising a broadcast to each processor in a multiprocessor to remove an association between the virtual memory page and a corresponding physical memory location, wherein the invalidation is delayed by a predetermined duration in response to a size of the memory buffer being smaller than a predetermined buffer threshold.

11. The computer program product of claim 10, wherein the non-transitory computer readable storage medium further comprises instructions to increment, in response to delaying the invalidation, a count of a number of free frames in an address space of an application that allocated the memory buffer, a count of a total number of free frames, and a monotonic counter of a number of free frames freed.

12. The computer program product of claim 10, wherein the invalidation of the virtual memory page is not delayed, in response to another virtual memory page adjacent to the virtual memory page being backed by a freed frame.

13. The computer program product of claim 10, wherein the invalidation of the virtual memory page is delayed in response to the virtual memory page being of a predetermined type.

14. The computer program product of claim 10, wherein the invalidation of the virtual memory page is delayed in response to free amount of memory available being below a predetermined threshold.

15. The computer program product of claim 10, wherein the invalidation of the virtual memory page is delayed in response to:
   a number of free frames in an address space for an application that allocated the memory buffer not being lesser than a predetermined target number of free frames for the address space.

16. The computer program product of claim 10, wherein the invalidation of the virtual memory page is delayed in response to:
   another virtual memory page adjacent to the virtual memory page being a valid frame that has not been freed.

17. A method comprising:
   associating, by a storage manager, a virtual memory page with a memory buffer that is used by an application being executed by a multiprocessor system; and
   in response to a request, from the application, to deallocate the memory buffer, invalidating the association between the virtual memory page and a corresponding physical location in a memory, wherein the invalidation is delayed by a predetermined duration in response to a size of the memory buffer being smaller than a predetermined buffer threshold.

18. The method of claim 17, wherein the invalidation of the mapping comprises broadcasting, to each processor of the multiprocessor system, a request to remove an association between the virtual memory page and the physical memory location.

19. The method of claim 17, wherein the invalidation of the mapping is delayed further in response to:
   a number of free frames in an address space for the application not being lesser than a predetermined target number of free frames for the address space.

20. The method of claim 17, wherein the invalidation of the mapping is delayed further in response to:
   another virtual memory page adjacent to the virtual memory page being a valid frame that has not been freed.

* * * * *